United States Patent
Remmers et al.

[15] 3,648,994
[45] Mar. 14, 1972

[54] PROCESS FOR CALCINING GYPSUM IN A CURRENT OF HEATING GAS

[72] Inventors: Karl Remmers, Dusseldorf-Benrath, Germany; Gerhard Bertoldi, Graz; Karl Leitner; Erich Eigner, both of Radenthein, all of Austria

[73] Assignee: Rheinstahl Strico GmbH, Hilden, Rhineland, Germany

[22] Filed: Aug. 6, 1970

[21] Appl. No.: 61,743

[30] Foreign Application Priority Data
Aug. 6, 1969 Germany ..................... P 19 40 007.8

[52] U.S. Cl. ........................................... 263/53 A
[51] Int. Cl. ......................................... C04b 11/02
[58] Field of Search ........................... 263/53, 53 A

[56] References Cited
UNITED STATES PATENTS
3,437,330   4/1969   Worner ........................... 263/53 A Primary Examiner—John J. Camby
Attorney—McGlew and Tuttle

[57] ABSTRACT

A process for calcining gypsum in a current of heating gas in a cyclone plant which comprises in combination the steps of a. introducing said heating gas into the calcining zone at a temperature higher than that of the calcined goods at their discharge, by the smallest possible difference;

b. maintaining the goods to be calcined in the current of heating gas for a short and adjustable time; and c. adjusting the relative moisture content of the heating gas in dependence on the operating temperature.

Many different phases and modifications of calcined gypsum can so be made of highest, uniform quality.

23 Claims, 4 Drawing Figures

PROCESS FOR CALCINING GYPSUM IN A CURRENT OF HEATING GAS

FIELD OF INVENTION

The present invention relates to the calcining of gypsum in a current of heating gas.

The raw material for gypsum plaster is calcium sulfate dihydrate ($CaSO_4 \cdot 2 H_2O$) which can be converted by calcining into a number of phases which depend on the calcining temperatures and conditions; one is e.g., hemi-hydrate ($CaSO_4 \cdot \frac{1}{2} H_2O$) which may have different modifications (crystal structures); another one is anhydrous anhydrite ($CaSO_4$), which may again come in different modifications. The attached Table gives a synopsis of the various phases and their principal properties.

BACKGROUND INFORMATION AND PRIOR ART

Up to the present, it was not possible to produce all or almost all phases and modifications either separately or in desired mixtures, in a single calcining apparatus. Thus, for instance, hemi-hydrate gypsums with a calcining temperature of about 200° C. are preferably made, depending on the modification, in boilers, in autoclaves or in rotary kilns. The high temperature phases, that is to say, the different types of anhydrite are mostly produced in rotary kilns, shaft furnaces and chamber furnaces at temperatures of about 300° to 1,300° C.

Quite recently, combined grinding and drying plants have become known for the production of hemi-hydrate phases. Furthermore, it has already been proposed to effect final drying operations of gypsums obtained in said combined drying and grinding plants, in calcining plants using cyclones. In that arrangement, the gypsum ground in the drying-grinding plants and pre-dried therein, is passed through several calcining pipes with serially disposed cyclone separators, in counter current to the heating gas.

Of particular importance among the gypsum modifications is valuable α-hemi-hydrate, which is advantageously prepared at higher steam pressures and -saturations in autoclaves, partly in multiple-stage calcining operations. α-hemi-hydrate imparts to gypsum plaster higher strength as compared to β-hemi-hydrate.

However, with all the mentioned known methods and devices, only one or another type of gypsum plaster can be produced, and it is not up to the operator to select any or almost any desired kinds.

SUMMARY OF THE INVENTION

It is the object of the present invention to provide a process by which most modifications and groups of modifications of the different kinds of gypsum plasters can be made, either as separate modifications or in desired mixtures.

It is another object to produce any type of special kind of gypsum plaster in a manner that will secure a desired result with great accuracy.

It is yet another object to provide a method that permits to obtain the desired results in a single apparatus and in continuous operation.

Other objects and advantages of the invention will become apparent from the following detailed description and the accompanying drawings.

For achieving the above objects, the invention starts from the cyclone calcining process using preferably a plant with several cyclones arranged in series by operating under the following conditions:

a. The temperature of the heating gas current at the inlet is so adjusted that it will be higher than the temperature of the goods under treatment at the exit by the smallest possible difference. More particularly, the temperature of the heating gas current at the inlet is 1.1 – 2.6 times as high as the temperature of the goods at the discharge end;
b. the temperature of dwell of the goods in the heating gas current is adjustable;
c. the relative moisture of the heating gas current is adjustable in dependence on the operating temperature.

The smallest possible difference in temperatures between entering heating gas current and goods at their discharge is of special significance. Although, for reasons of heat transfer it is always necessary that the entering gas current be of a noticeable higher temperature than necessary for the dissociation or formation of the desired phase, there exists the danger that in addition to the desired phase, other phases are formed which are undesirable. Thus e.g., the dissociation temperature for the formation of hemi-hydrate from dihydrate as found in the laboratory, is at 105° C. However, at about 150° C., portions of the phase anhydrite III are already formed. As mentioned above, it is therefore necessary to keep the temperature difference between entering heating gas current and discharged goods as small as possible, when, according to the invention, gypsum plasters of pure phases or modifications are to be obtained or products of a definite composition of phases.

Since it is not possible to operate with large amounts of gases at low excess temperature — which would be very uneconomical — since, on the other hand, it would be undesirable to exceed the dissociation temperature of a desired phase in an unfavorable manner, a further development of the invention consists of first pre-heating the goods to be treated at a temperature which is definitely below the dissociation temperature of the desired phase, at the same time causing some drying. For instance, for the formation of β-hemi-hydrate, the temperature is about 90° C., the goods being subsequently heated to the calcining temperature proper.

In that manner one can be sure that only the start of the dissociation will occur, while the reaction proper will take place during the second temperature treatment or the real calcining operation. In order to speed up the reaction, the second heating will be carried out at a certain higher temperature than the one found for the dissociation and equilibrium in the laboratory testing.

The best pre-heating temperature depends on the desired discharge temperature of the goods. As already stated, it is 90° C. for β-hemi-hydrate, at about 150° C. for anhydrite III, and still higher for higher anhydrite phases.

Pre-heating can take place, if desired, outside of the cyclone plant in a special apparatus, sometimes during the grinding process.

In addition to the regulation of the temperature of the heating gas current, the adjustment of the time during which the goods stay in the gas current, or time of dwell, is of importance.

That time should be adjustable, according to the invention, in the range of 0.5 to 10 seconds, in order to regulate the calcining conditions necessary for any individual product. The contents of the various phases can be thus influenced or determined. Contrary to the treatment time in a gypsum boiler, 1–4 hours, and a rotary kiln, 15–45 minutes, the raw materials are only heated up to the necessary calcining temperature for a very short time, so that mass crystallization of primary crystal groups, which is undesirable, is avoided during dissociation and change of phases. In that manner, a more reactive final product is obtained.

The time of dwell of the goods in the heating gas stream can be regulated, according to the invention, by changing the gas velocity, and/or by adding or cutting out some cyclone units and/or by changing the length of the immersed tubes in the cyclones.

The gypsum used in the process of the invention is ground to a gram size of 2 mm. at the utmost; the preferred size is 5 to 400μ (microns).

In the accompanying drawings the process of the invention will be more fully illustrated. In the drawings:

FIG. 1 schematically illustrates an embodiment of a cyclone plant for carrying out the process of the invention;

Figure 1:
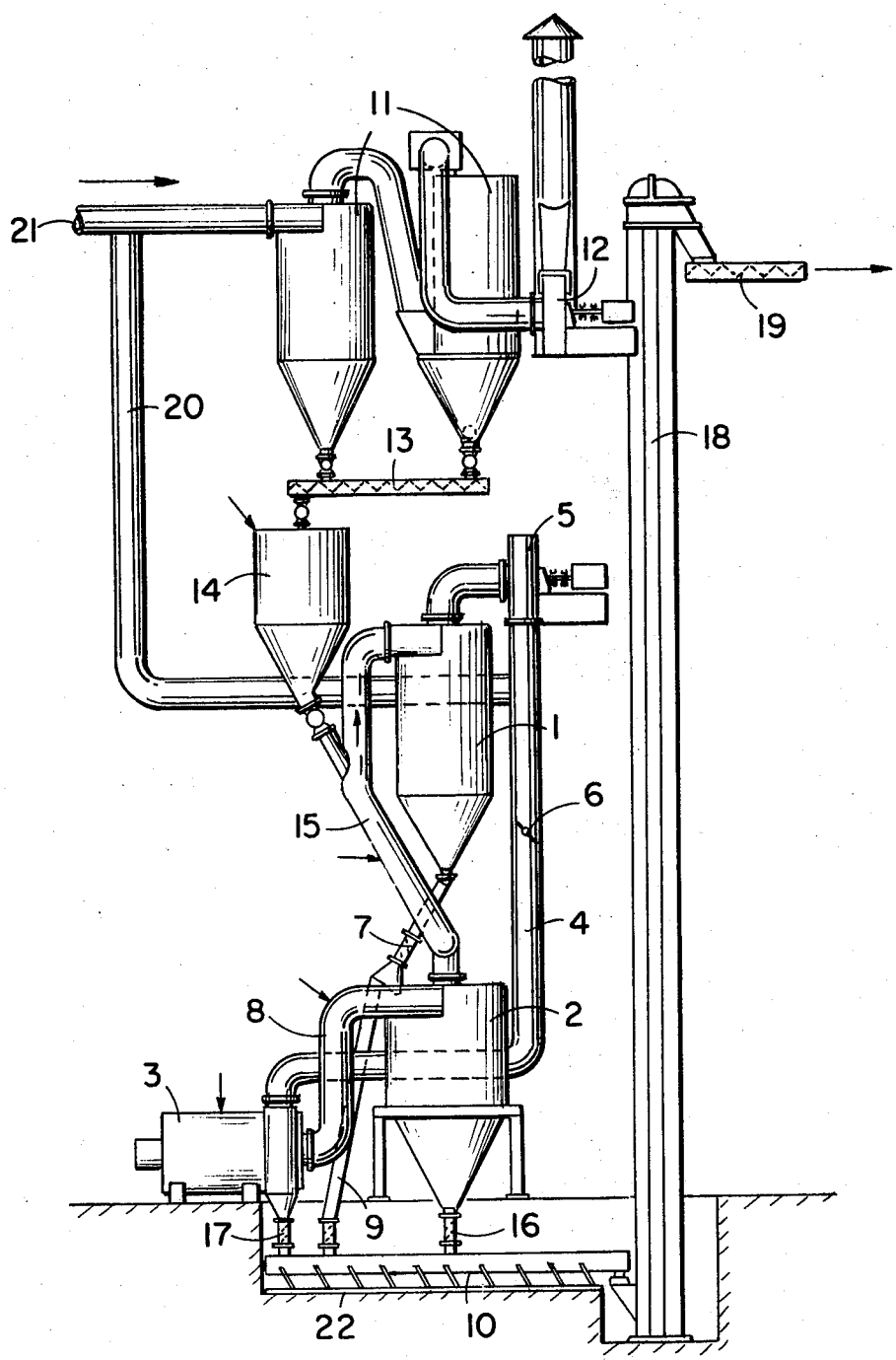

Referring now to FIG. 1, the cyclones for the treatment of the goods which are arranged in series, are designated by 1 and 2. Combustion chamber 3 is provided for the supply of heating gas. The combustion chamber is connected with a gas return pipe 4 leading to exhaust fan 5 of cyclone 1; pipe 4 is fitted with a regulating flap 6.

Raw material arriving from the grinder (not shown) through a pipe 21, is first passed through dust separators 11 connected to an exhaust fan 12; a screw conveyor 13 arranged below the dust separators delivers the goods to a silo 14 from where they pass by means of a heating gas pipe 15 to cyclone 1.

From cyclone 1, a tube 7 carries the goods either into pipe 8, which is a heating gas pipe, from where they may pass into cyclone 2; or, alternatively, the goods are passed through a by-pass line 9 directly to conveyor ring 10. In the latter case, the goods are only treated in cyclone 1. Waste gas still containing some dust is sucked off by exhaust fan 5 from cyclone 1 and is either returned to combustion chamber 3, or passed by means of a pipe 20 to the dust collectors 11.

A spraying device 22 is provided for cooling the conveyor rings 10 where the calcined goods are collected from cyclone 2 by way of line 16 or arrive through by-pass line 9. Some goods arriving through gas return line 4 are also deposited at the exit of chamber 3 by line 17. An elevator 18 takes the cooled goods up to screw conveyor 19 serving for transportation to bins (not shown) where the different kinds of calcined gypsum are stored and sorted.

The operation of the plant illustrated in FIG. 1 is explained in the following Examples 1a and 1b.

EXAMPLE 1a

Treatment of goods in a single cyclone

10st/hr. of gypsum ($CaSO_4 \cdot 2 H_2O$) ground to a grain size of 5400 $\mu$ are passed through the dust separators 11 and via silo 14 and the heating gas pipe 15 to cyclone 1. At the inlet to the cyclone, the gas temperature is 240° C. In the cyclone, the goods remain for about 5 seconds during which time the temperature gradually drops to 120° C. when the goods are about to be discharged. They are then carried on through pipes 7 and 9 to the conveyor rings 10. These rings are cooled by the spraying device 22 to a temperature of about 50° C., and while the goods pass over the conveyor they are cooled down to room temperature. They are then hoisted by the elevator 18 and passed by conveyor 19 to storage bins. The product obtained under the operating conditions of is example is molding plaster.

EXAMPLE 1b

Treatment of goods in two cyclones

The treatment is the same as described under 1a until the goods have remained the proper time in cyclone 1 by a gas temperature of 500° C. and are ready to be passed to cyclone 2 for further calcining treatment at higher temperature. The gas temperature at the inlet of cyclone 2 is 300° C. In cyclone 2 the goods remain for 5 seconds during which time the temperature drops to 150° C. when the goods leave cyclone 2 to be passed on to the rings 10 for cooling and further handling in the storage bins. The product obtained under the operating conditions of this example is gypsum plaster.

In some cases it is desired to add water or steam to influence the calcining process. As a general rule we may state that the moisture content of the heating gas should range from 40–95 percent.

The adjustability of the moisture content of the heating gas current is an important characteristic of the present invention. In no other process was the moisture of the gas made to act immediately on the goods under calcination and in an even manner. The moisture influences phase formation, since the dissociation is dependent on the partial pressure of the steam. Since the moisture is also capable of shifting the phase equilibrium, e.g., between hemi-hydrate and anhydrite III, it is possible to change anhydrite III back into hemi-hydrate by changing the moisture in the gas and thereby to obtain higher phase purity.

The addition may be advantageously carried out by introducing water or steam into combustion chamber 3 or into pipe 8.

Another reason why the regulation of the moisture of the gas is of importance is that it influences the seed formation of crystals. Higher partial pressures of steam decrease the number of primary seeds, lower partial pressures of steam increase them. This again may influence the reactivity of the final product.

A particular embodiment of the invention connected therewith is that for the production of $\alpha$-hemi-hydrate-containing products the moisture content of the current of heating gas is adjusted to such a high degree that it comes as near as possible to the saturation limit.

The moisture content of the heating gas can also be adjusted according to the invention by increase of the moisture content of the raw material.

It is also an important feature of the invention that to the current of the heating gas or to the raw material hygroscopic substances are added in dry state or in solution. Such substances are, e.g., calcium chloride ($CaCl_2$) with various contents of crystal water, magnesium chloride ($MgCl_2 \cdot 7 H_2O$), phosphorus pentoxide ($P_2O_5$), sodium hydroxide (NaOH), potassium hydroxide (KOH), or calcium hydroxide ($Ca(OH)_2$).

The hygroscopic substances mentioned, whose hygroscopicity is partly extremely high, are deposited on the surface of the goods' particles and enhance the formation of a layer of steam thereon. A particularly valuable final product can thereby be obtained, namely a gypsum plastic in the set state (modified gypsum) which basically differs from ordinary gypsum products in their strain — elongation behavior. Such gypsum products containing about 0.05 – 0.09 percent by weight of a hygroscopic salt no longer follow Hook's law, that is to say, deformation is no longer proportional to strain, but there remains a high residual deformation or high plastic deformation, a property particularly important for gypsum plasters and finish coats.

For adding hygroscopic substances, the best spots for introduction are heating pipes 8 or 15, or silo 14.

As will have become apparent from the above, the cyclone-calcining process of the invention has the advantage that water or steam, on the one hand, and hygroscopic substances, on the other hand, can be added at a well-defined point of the short-time calcining reaction which results in an influencing of the crystal structure leading to especially valuable final products.

As already mentioned, the relationship of the temperature, at which the heating gas is admitted and the temperature at which the goods are discharged from the calcining operation, is of great significance. The difference between these temperatures should be as small as possible.

Figure 2:
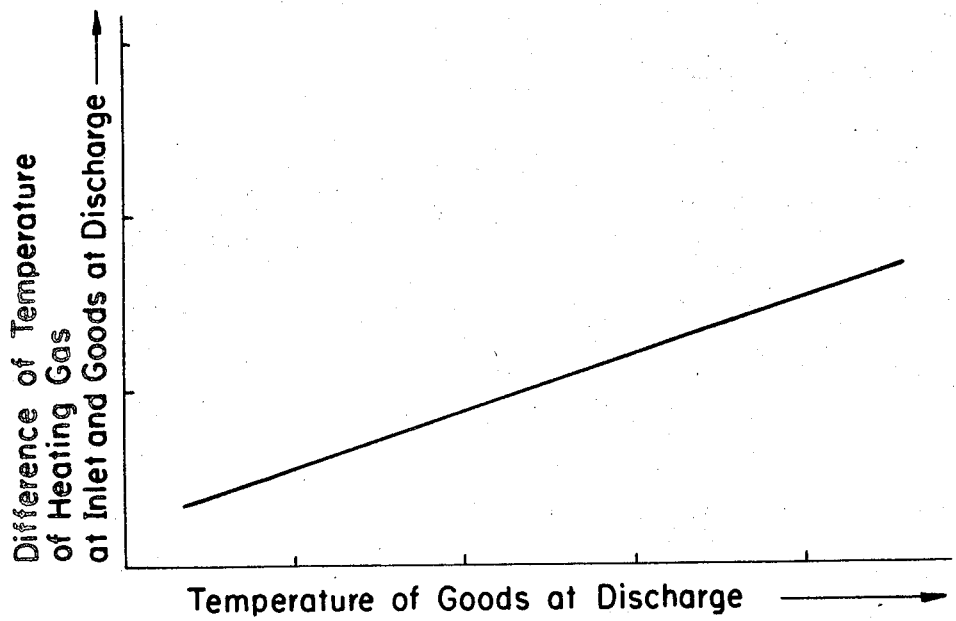
FIG. 2 is a diagram in which the temperature of the goods at the discharge is plotted on the abscissa, the difference between that temperature and the heating gas temperature at the inlet is plotted on the ordinate.

FIG. 2 illustrates diagrammatically the relationship as found in the operation of the apparatus described. The line defining the difference between heating gas temperature at the inlet and temperature of the goods at discharge may lie at a higher or lower level depending on the conditions of operation.

Figure 3:
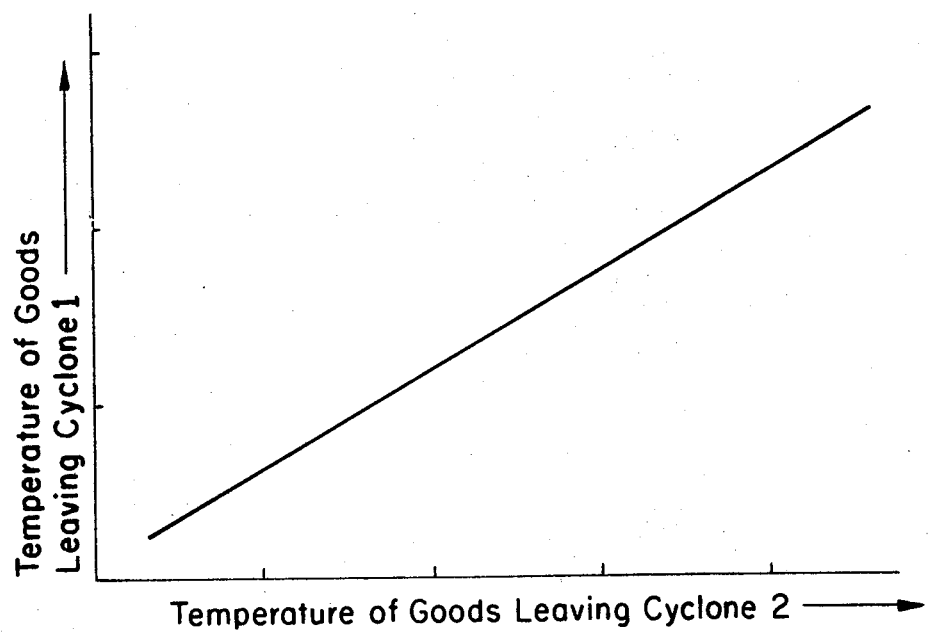
FIG. 3 is a diagram registering the temperatures of the goods after cyclones 1 and 2, respectively.

FIG. 3 shows, for the same apparatus, the temperature of the goods having passed the first cyclone (ordinate) and the temperature of the goods leaving the second cyclone (abscissa). When the conditions of the operation are changed, e.g., when the difference between gas temperature at the inlet and goods temperature at the discharge, is higher, the line indicating the temperature of the goods leaving cyclone 1 will lie at a higher level.

This shows the variability of the process according to the invention. The calcining conditions are adjusted much more readily and quickly than in a rotary kiln, shaft furnace or gypsum boiler.

A few more examples are given below in an abbreviated form, the details of procedure being the same as described in greater detail in Examples 1a and 1b.

Raw Materials

Ground gypsum from the quarry, with 82 percent dihydrate of the following grain size:

| Mesh | Residue |
|---|---|
| 0.032 cm | 32.9% |
| 0.040 cm | 28.7% |
| 0.063 cm | 20.9% |
| 0.090 cm | 14.1% |
| 0.125 cm | 6.5% |

PRODUCTS:

Example 2

| Molding Plaster (ASTM C 59-50) | |
|---|---|
| Heating Gas Inlet Temperature | 240° C. |
| Goods Discharge Temperature | 160° C. |

Example 3

| Gypsum Plasters, also finishing coat | |
|---|---|
| Heating Gas Inlet Temperature | 500° C. |
| Goods Discharge Temperature | 345° C. |

Example 4

| Flooring Plaster | |
|---|---|
| Heating Gas Inlet Temperature | 1100° C. |
| Goods Discharge Temperature | 800° C. |

Example 5

| Plastic Gypsum (Modified Gypsum) | |
|---|---|
| Heating Gas Inlet Temperature | 240° C. |
| Goods Discharge Temperature | 160° C. |

This type of gypsum plaster is made by injection of hygroscopic salts (calciumchloride and magnesium chloride) in concentrated solution into heating gas pipe 15. They are of particular usefulness in certain types of mortars and finishing coats.

Figure 4:
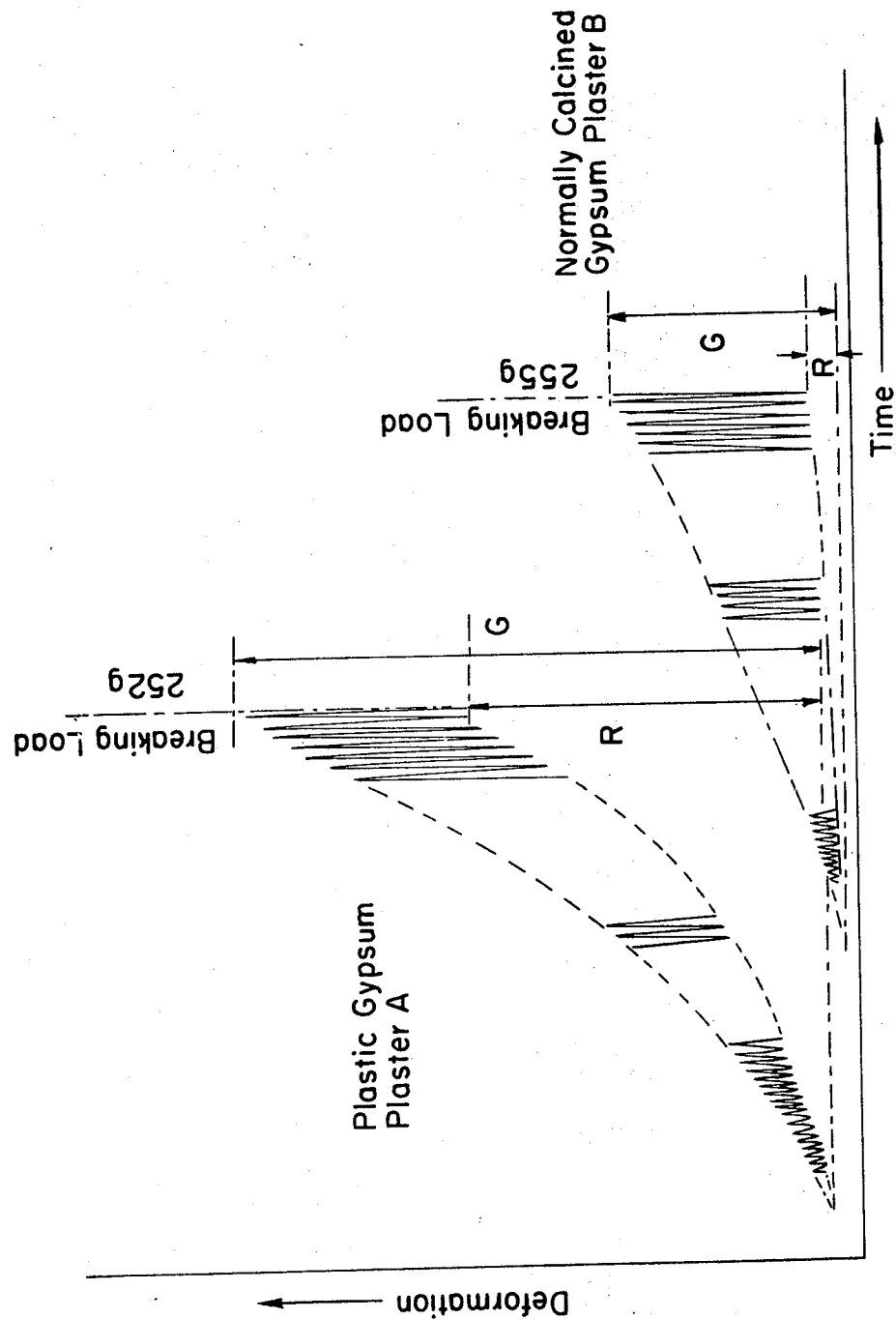
FIG. 4 is a diagrammatic illustration of the strain and deformation conditions of one type of gypsum plaster.

FIG. 4 illustrates deformation behavior under load, of the last-described plastic gypsum plaster A as compared to a normally calcined gypsum B with the discharge temperature of the goods about 160° C. Both types have about the same breaking strength of approx. 250 g. For the test, specimens of A and B were subjected to an inductively operated measuring device after application and removal of load. In the diagram, G designates total deformation, R residual or plastic deformation. As may be seen from the diagram, in specimen A, residual deformation R is from the beginning much higher (about 60 percent) of the total deformation G, whereas B only has a residual deformation of about 12.2 percent. Moreover, the total deformation G occuring at the breaking load is for specimen A about 2.6 times the total deformation G of normally calcined gypsum.

As will have become apparent from the above, the various types of gypsum plasters made according to the invention are by far superior in many respects as compared to conventionally made products and they are of uniformly excellent quality.

What is claimed is:

1. A process for calcining gypsum in a current of heating gas in a cyclone plant which comprises in combination the steps of
   a. introducing said heating gas into the calcining zone at a temperature higher than the temperature of the calcined goods at their discharge by the smallest possible difference;
   b. maintaining the goods to be calcined in the current of heating gas for a short and adjustable time; and
   c. adjusting the relative moisture content of the heating gas in dependence on the operating temperature.

2. The process according to claim 1, wherein the temperature of the entering heating gas current is between 1.1 and 2.6 times as high as the temperature of the goods at their discharge.

3. The process according to claim 1, wherein the goods to be calcined are first pre-heated at a temperature lying definitely below the dissociation temperature necessary for the formation of the desired gypsum phase and thereafter heating the goods to the calcining temperature proper.

4. The process according to claim 3, wherein the temperature of preheating is maintained at about 90° C. for the formation of $\beta$-hemi-hydrate.

TABLE

| Dry dehydration (steam-partial-pressure difference high) | Wet dehydration (steam-partial pressure difference small) | Equilibrium in ° C. | Temperature at calcining in ° C. | Expansion | Strength | Setting time |
|---|---|---|---|---|---|---|
| | $CaSO_4 \cdot 2H_2O = \alpha\text{-}CaSO_4 \cdot \frac{1}{2}H_2O + OH_2O + 3/2H_2O$ ($\alpha$-hemi-hydrate) | 97 | 110–130 | High | Extremely high. | Long. |
| $CaSO_4 \cdot 2H_2O = \beta\text{-}CaSO_4 \cdot \frac{1}{2}H_2O + OH_2O$ ($\beta$-hemi-hydrate) | | 109 | 125–190 | Medium | Good | Medium. |
| $CaSO_4 \cdot \frac{1}{2}H_2O = \beta\text{-}CaSO_4III \frac{1}{2}H_2O$ (soluble—anhydrite III) | | 151 | 200–290 | Medium | Good to moderate. | Short. |
| | $\alpha\text{-}CaSO_4 \frac{1}{2}H_2O = CaSO_4II + \frac{1}{2}H_2O$ (unsoluble anhydrite II) | | 150–200 | | | |
| $\alpha\text{-}CaSO_4III \searrow CaSO_4II \nearrow \beta\text{-}CaSO_4III$ | | | 400–600 | High | Low | Very long. |
| $CaSO_4II \rightarrow CaSO_4I$ (high temperature anhydrite (I)) | | | 600–800 | High | Low to high. | Very long. |
| $CaSO_4I = CaO + SO_3$ (final decomposition) | | | 800–1,200 | | | |

5. The process according to claim 1, wherein the time of dwell of the goods in the heating gas current is adjustable between 0.5 and 10 seconds.

6. The process according to claim 1, wherein the time of dwell for the goods to be calcined in the heating gas is adjusted by changing the rate of gas admission.

7. The process according to claim 1, wherein the time of dwell for the goods to be calcined in the heating gas is adjusted by the number of heating calcining zones.

8. The process according to claim 1, wherein the relative moisture of the heating gas is adjustable to 40–95 percent by weight.

9. The process according to claim 8, wherein the moisture of the heating gas is adjusted near to the saturation limit at the temperature of 160° C. in the preparation of $\alpha$-hemi-hydrate.

10. The process according to claim 1, wherein the moisture of the heating gas is adjusted by addition of water or steam to the current.

11. The process according to claim 1, wherein the moisture of the heating gas is adjusted by increasing the moisture contents of the raw material.

12. The process according to claim 1, wherein to the heating gas or the raw material a hygroscopic substance is added which is a member of the group consisting of $CaCl_2$ with various crystal water contents, $MgCl_2 \cdot 7 H_2O$, $P_2O_5$, $NaOH$, $KOH$, and $Ca(OH)_2$.

13. The process according to claim 1, wherein the raw material has a grain size of 2 mm. at the utmost.

14. The process according to claim 13, wherein the raw material has a grain size of 5 to 400$\mu$.

15. In the method of combustion of gypsum starting material in a heating gas stream formed by heating a gas, in a cyclone combustion system with a plurality of cyclones in series, the improvement which comprises:
   a. adjusting the temperature of the entering heating gas stream so that said temperatures amount to from about 1.1 to about 2.6 times the exit temperature of the starting material to be treated;
   b. adjusting the residence time of the said material in the heating gas stream in the range of about 0.5 to about 10 sec;
   c. adjusting the relative humidity of the heating gas stream in the range of about 40 to about 95 percent, referred to the operating temperature, said starting material having a grain size not greater than 2mm.

16. Method according to claim 15, wherein said material size ranges from between about 5 and about 400 micron.

17. Method according to claim 16, wherein said material is first preheated and dried at a temperature which is clearly below the dissociation temperature for the formation of the gypsum phase to be produced.

18. Method according to claim 17, wherein said temperature is below 90° for the production of beta-semihydrate, the material being subsequently heated to the actual burning temperature.

19. Method according to claim 15, wherein the residence time of the said material in the heating gas stream is adjusted by varying the gas velocity and/or switching cyclones on and off and/or varying the immersion tube length of the cyclones.

20. Method according to claim 15, wherein for the production of alpha-semihydrate, the moisture content of the heating gas stream is adjusted so high that it comes as close as possible to the saturation limit.

21. Method according to claim 15, wherein the moisture of the heating gas stream is regulated by addition of water/water vapor to the gas stream and/or by increasing the moisture content of the raw material.

22. Method according to claim 15, wherein there are added to the heating gas stream or to the raw material, hygroscopic substances.

23. Method according to claim 22, wherein said hygroscopic substances consist essentially of at least one of calcium chloride ($CaCl_2$) with different contents of water of crystallization, magnesium chloride ($MgCL_2 \cdot 7H_2O$), phosphorus pentoxide ($P_2O_5$), sodium hydroxide ($NaOH$), potassium hydroxide ($KOH$) or calcium hydroxide ($Ca(OH)_2$) (dry or dissolved).

* * * * *